United States Patent
Pittman et al.

(10) Patent No.: US 10,116,354 B2
(45) Date of Patent: Oct. 30, 2018

(54) HARVEST TAG DESIGN AND SYSTEMS

(71) Applicants: VIETAGZ LLC, Sarasota, FL (US); IZIPLINE, LLC, Sarasota, FL (US)

(72) Inventors: William T. Pittman, Sarasota, FL (US); Michelle Moulin, Sarasota, FL (US); Keoki Trask, Lakewood Ranch, FL (US)

(73) Assignees: VIETAGZ, LLC, Sarasota, FL (US); IZIPLINE, LLC, Sarasota, FL (US)

( * ) Notice: Subject to any disclaimer, the term of this patent is extended or adjusted under 35 U.S.C. 154(b) by 0 days.

(21) Appl. No.: 15/402,190

(22) Filed: Jan. 9, 2017

(65) Prior Publication Data

US 2017/0201296 A1    Jul. 13, 2017

Related U.S. Application Data

(60) Provisional application No. 62/276,585, filed on Jan. 8, 2016.

(51) Int. Cl.
*H04B 5/00* (2006.01)

(52) U.S. Cl.
CPC ......... *H04B 5/0037* (2013.01); *H04B 5/0062* (2013.01); *Y02D 70/00* (2018.01); *Y02D 70/164* (2018.01); *Y02D 70/166* (2018.01)

(58) Field of Classification Search
CPC .......... H04B 17/11; H04B 17/21; H04B 1/38; H04B 1/40; H04B 5/0037
USPC ....................................................... 455/41.1
See application file for complete search history.

(56) References Cited

U.S. PATENT DOCUMENTS

| | | | | |
|---|---|---|---|---|
| 2013/0271265 A1* | 10/2013 | Finn | ...................... | H01Q 1/2225 340/10.1 |
| 2014/0285416 A1* | 9/2014 | Priyantha | ............. | H04B 5/0037 345/156 |
| 2015/0076909 A1* | 3/2015 | Biederman | .......... | G02B 27/017 307/44 |
| 2017/0093463 A1* | 3/2017 | Wang | ................... | H04B 5/0037 |

* cited by examiner

*Primary Examiner* — Ajibola Akinyemi
(74) *Attorney, Agent, or Firm* — Shumaker, Loop & Kendrick, LLP; Jeffrey B. Fabian

(57) ABSTRACT

The instant invention is directed to a tuned inductive coil that is designed to work within the field of a separate NFC (Near Field Communication) tag for the purpose of harvesting ambient energy that is transmitted during the bi-directional signal process in order to effect unique functionality which requires higher energy consumption and which would not otherwise be possible or as effective absent such harvest of energy such as, but not limited to operation of a light, a sound or a tactile transducer or similar circuitry, separate of the function of the nearby NFC tag.

9 Claims, 12 Drawing Sheets

HARVEST TAG DESIGN AND SYSTEMS

CROSS-REFERENCE TO RELATED APPLICATIONS

This application is a non-provisional application of U.S. Provisional Patent Application 62/276,858 filed on Jan. 8, 2016 which is incorporated herein in its entirety by reference along with PCT Application No. WO 2015/147946.

FIELD OF INVENTION

The instant invention is directed to a tuned inductive coil that is designed to work within the field of a separate NFC (Near Field Communication) tag for the purpose of harvesting ambient energy that is transmitted during the bi-directional signal process in order to effect unique functionality which requires higher energy consumption and which would not otherwise be possible or as effective absent such harvest of energy such as, but not limited to operation of a light, a sound or a tactile transducer or similar circuitry, separate of the function of the nearby NFC tag.

BACKGROUND

The use of NFC technology for remotely bridging connections between users and machines or machine and machine is known. For example, retail shops, transportation terminals, industrial factories and other areas of large user congregation such as colleges and outdoor events all use contactless, NFC-enabled POS ("Point of Sale") terminals, ticketing terminals, access control points or objects embedded with NFC technology to process payments or exchange open or secure data. However, it is appreciated that the randomness of Nearfield Communication connections leaves the end user disengaged with the point of interaction and that restrictions on mobile device hardware and/or software limits the engagement notification capabilities of the engagement operators.

In addition to the above, the use of inductive coil arrangements for the purpose of remotely powering electronic hardware and circuitry such as a light, a buzzer, a microphone, camera or a tactile motor is also known.

"Passive" or non-powered inductive coils for use with mobile devices have operated either with the purpose of data transfer or low-power transmission. For example, in the retail purchase environment, the use of a portable electronic device ("PED") to communicate a secure payment request and payment processing gateway. Whereas in consumer electronics products, PED charging systems need only have a PED placed on or near them (not connected via a wired connection) in order to benefit from the use of an inductive coil for the purposes of a slow, but effective recharging of the PED's battery. Stated differently, prior design configurations utilize inductive coil designs for use in NFC communication protocols for data exchange or similar designs other design configurations to recharge PED batteries or power other devices or circuits.

Given the above, an inductive coil designed to achieve designed functionality or to enable enhanced functionality within the field of a standard NFC tag (hereafter referred to as "NFC tag") would be desirable.

SUMMARY OF INVENTION

A specialized, non-NFC, paired, inductive coil design is provided. The non-NFC inductive coil (hereafter referred to as "Harvesting Tag") can operate independently and without the presence of the nearby NFC tag, yet harvests more ambient energy when operated within the field of the nearby NFC tag during a traditional NFC engagement with a PED (hereafter referred to as "NFC engagement"). In this manner, the use of an inductive power transference coil that has been optimally tuned to operate within certain magnetic induction radiated field specifications (including but not limited to 13.56 MHz as used by the NFC protocol), can be used within the presence of an NFC tag and result in enhanced power collection for devices connected to the Harvesting Tag.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

As previously stated, the invention includes a specialized, non-NFC, paired, inductive coil design. The non-NFC inductive coil (hereafter referred to as "Harvesting Tag") can operate independently and without the presence of the nearby NFC tag, yet harvests more ambient energy when operated within the field of the nearby NFC tag during a traditional NFC engagement with a PED (hereafter referred to as "NFC engagement"). In this manner, the use of an inductive power transference coil that has been optimally tuned to operate within certain magnetic induction radiated field specifications (including but not limited to 13.56 MHz as used by the NFC protocol), can be used within the presence of an NFC tag and result in enhanced power collection for devices connected to the Harvesting Tag.

Dedicated hardware and/or software circuitry can be connected to the Harvesting Tag, which may be designed to utilize all or part of the collected energy for the powering of the attached circuitry. This circuitry may include but is not limited to a speaker, a buzzer, a vibratory transducer, a light or lighted material, an electroluminescent panel, an electroluminescent wire or an electroluminescent coating which is colored or lighted differently during NFC engagement when the Harvesting Tag is placed within the presence of an NFC tag as opposed to when it is isolated from the operating vicinity of the inductive field of an NFC tag. Similarly, such a transducer could be used to signal the completion of an NFC engagement transaction, so as to notify the user that a connection has been properly initiated or completed.

Figure 1:
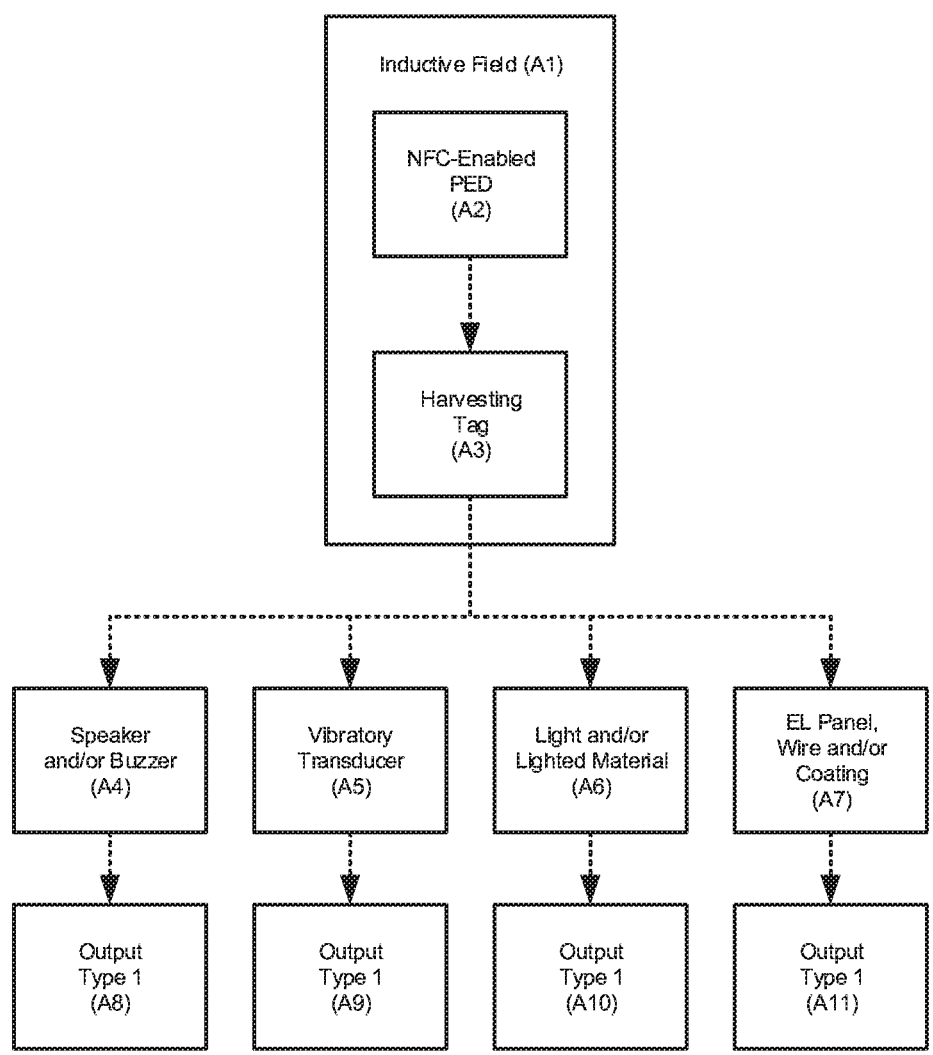
FIG. 1 is a schematic of a first embodiment of the invention.
Figure 2:
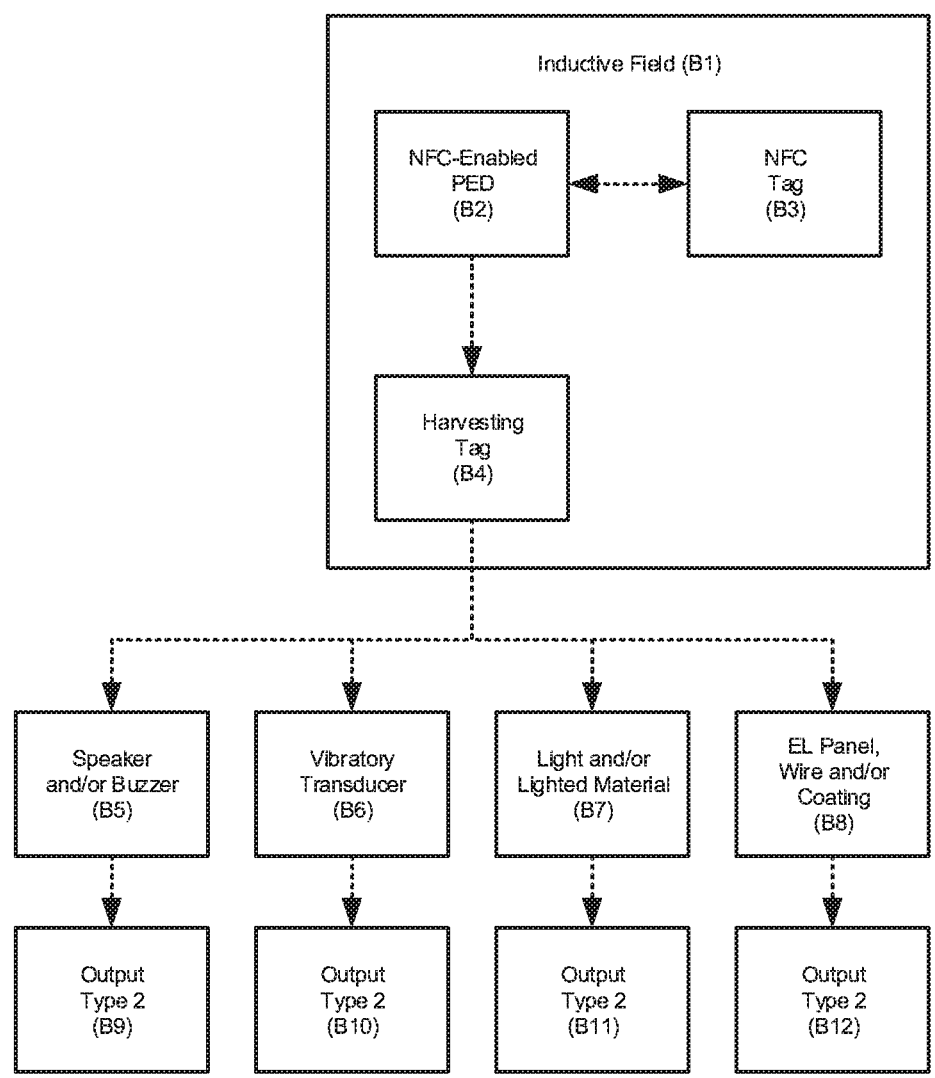
FIG. 2 is a schematic of a second embodiment of the invention.

Referring now to FIGS. 1 and 2, Harvesting Tags A3, B4 are shown transferring energy from A2, B2, during the inductive process while NFC-enabled PEDs A2, B2 are within an inductive field with NFC Tag B3 and Harvesting Tag A3 or B4 to one or many local hardware devices (A4-A7) outputting a first type (Type 1) of content that corresponds with each hardware device and device B5-B8 such as a sound device B5, vibratory transducer B6, light B7 and/or electroluminescent panel B8 (for examples) and outputting a second type (Type 2) of content that corresponds with each hardware device.

Other, more power demanding hardware and/or software circuitry can be added in order to record local environmental or transactional data within the vicinity of the NFC engagement. This circuitry may include localized hardware and/or software sensors and the electrical components required to operate such sensors. These sensor circuits may include but are not limited in scope to a camera, a microphone, a thermal sensor, a barometric sensor, an accelerometer, a GPS ("Global Positioning Satellite") receiver and the like. Data recorded by and/or on such devices may be stored on the sensor hardware circuitry, at a secondary local storage device, at a secondary remote storage device, on the user's mobile device and/or transmitted via the user's mobile device to a remote storage device such as a web-based hard-drive, "cloud-based network" or similar storage device.

Figure 3:
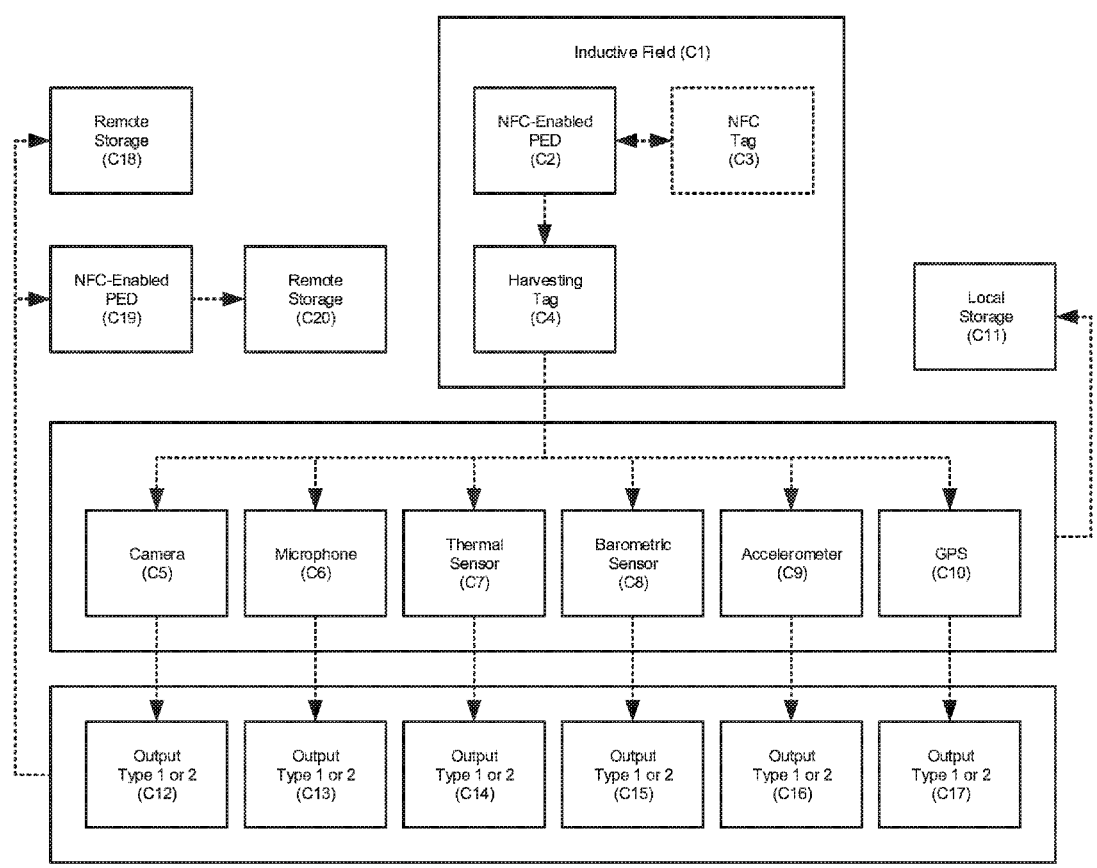
FIG. 3 is a schematic of a third embodiment of the invention.

FIG. 3 is a schematic diagram of the Harvesting Tag transferring energy to one or many local hardware devices with or without the presence of an NFC tag and outputting either Type 1 content or Type 2 content depending upon the presence of the NFC tag. FIG. 3 also shows the Type 1 or Type 2 content being saved to a local storage device or to a remote storage device.

Figure 4:
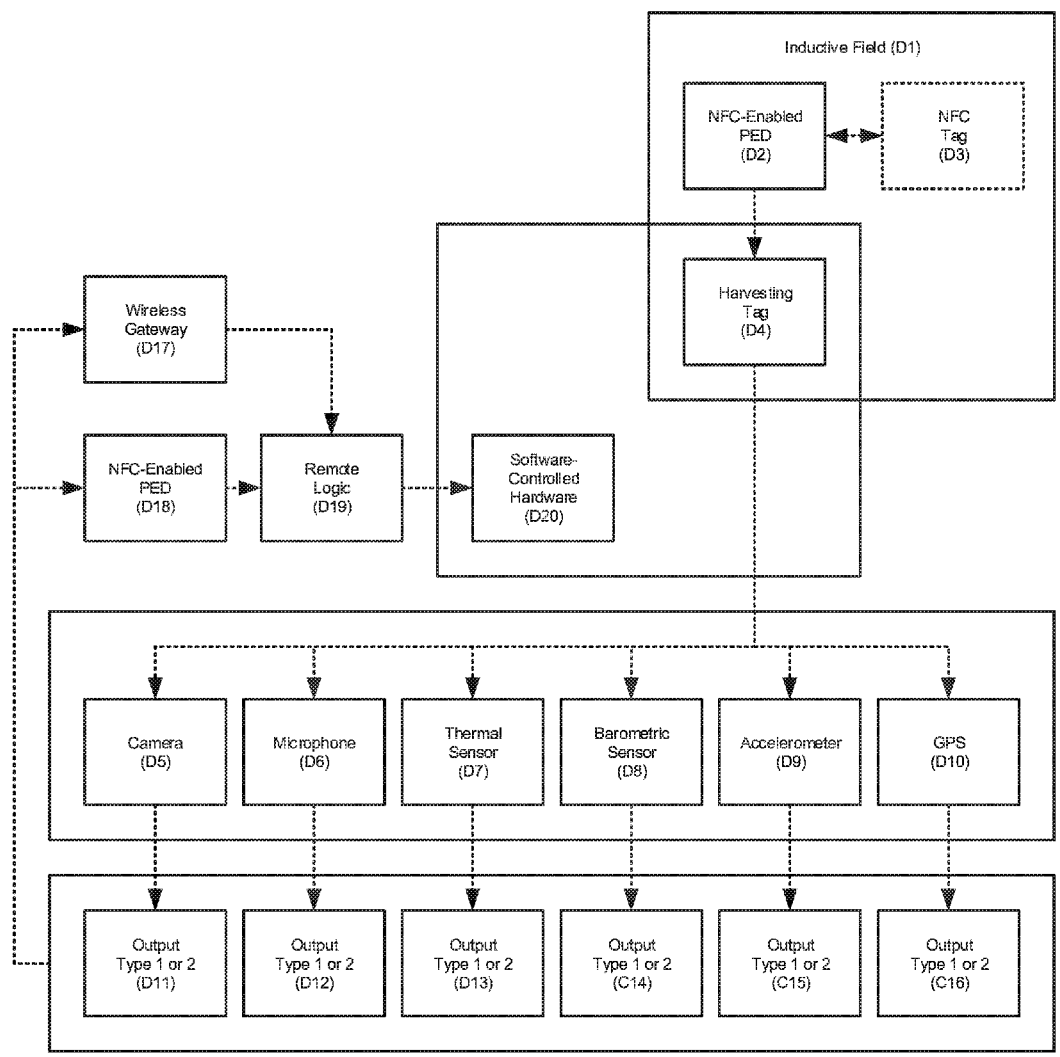
FIG. 4 is a schematic of a fourth embodiment of the invention.

FIG. 4 shows the Harvesting Tag transferring energy to one or many local hardware devices with or without the presence of an NFC tag and outputting either Type 1 content or Type 2 content depending upon the presence of the NFC tag. FIG. 4 also shows the Type 1 or Type 2 content being transmitted to a remote logic application for analysis and interpretation resulting in a decision that is then transmitted to software-controlled hardware that is localized to the Harvesting Tag.

Additional hardware and/or software can be added to the design and deployment of the Harvesting Tag so as to provide local and/or remote interactivity with the hardware and/or software that is physically attached to the Harvesting Tag. Such systems could include local and/or remote current provision and/or logic circuits which allow for the local Harvesting Tag circuitry and/or remote intelligence (such as $3^{rd}$-party analytics software operated via a service provider) to respond to human and/or machine interaction based on certain pre-determined security and/or campaign-driven directives. With such capabilities, it would be possible to provide photo proof-of-interaction during NFC engagement while simultaneously providing said capabilities within a battery-less package.

Figure 5:
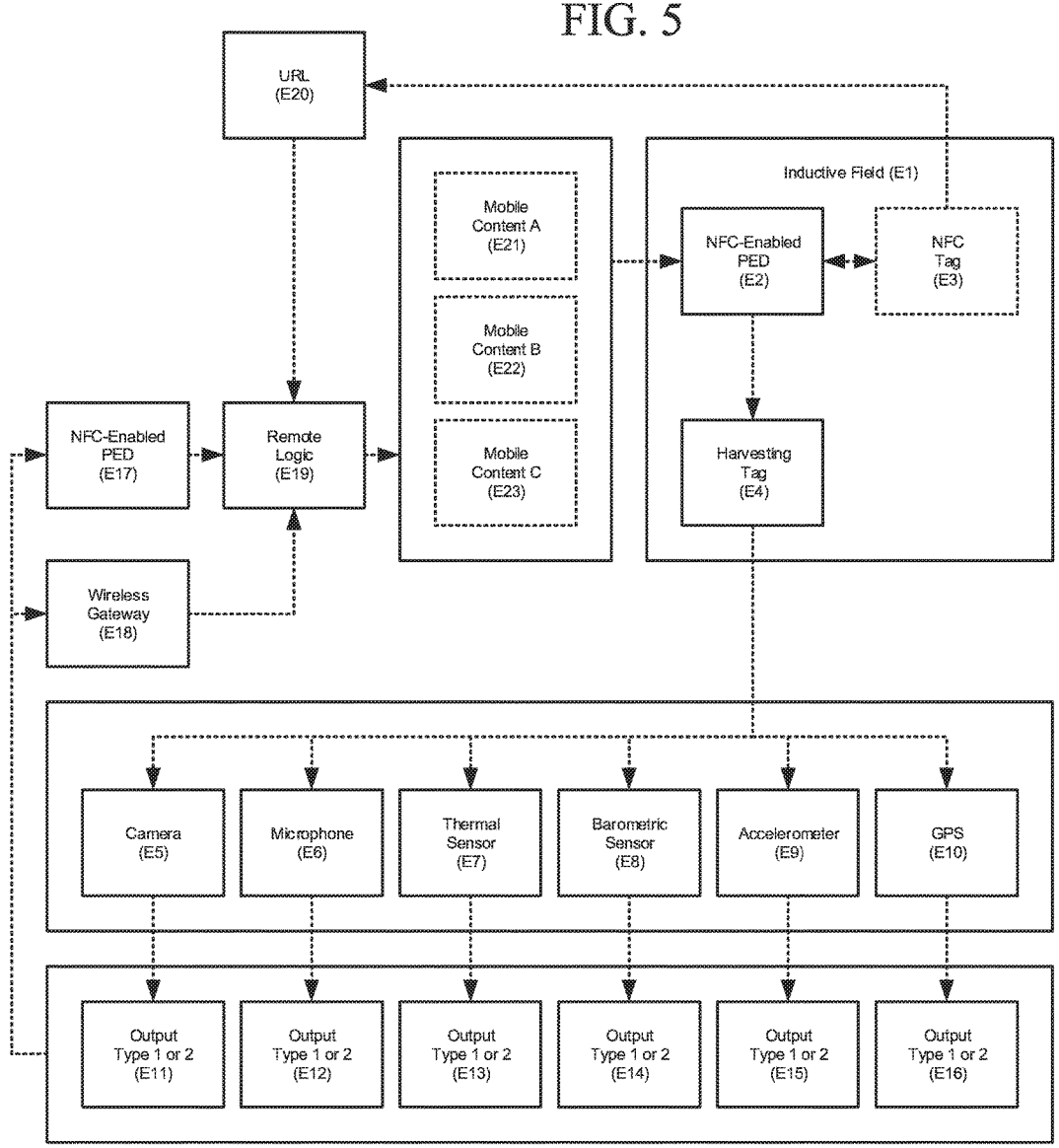
FIG. 5 is a schematic of a fifth embodiment of the invention.

FIG. 5 is a schematic diagram of the Harvesting Tag transferring energy to one or many local hardware devices with or without the presence of an NFC tag and outputting either Type 1 content or Type 2 content depending upon the presence of the NFC tag. FIG. 5 also shows the Type 1 or Type 2 content being transmitted to a remote logic application for analysis and interpretation resulting in a decision that selects the content that the NFC tag URL will redirect to.

And further-still, these hardware and software systems can be connected to the delivery or non-delivery of data that is facilitated by the design of the nearby, yet physically disconnected NFC tag. As NFC tags are often used to transmit and initiate a web URL for secure or non-secure information and/or files, such systems could be used to measure, record and/or authenticate certain environmental parameters during NFC engagement for proper routing of the NFC tag's content. With such capabilities, it would be possible to enable various bio-metric purposes such as but not limited to cloud-based facial recognition authorization services during NFC engagements that would require authentication prior to the delivery of the desired content and/or prior to releasing physical locks within the environment of the NFC engagement while simultaneously providing said capabilities within a battery-less package.

Figure 6:
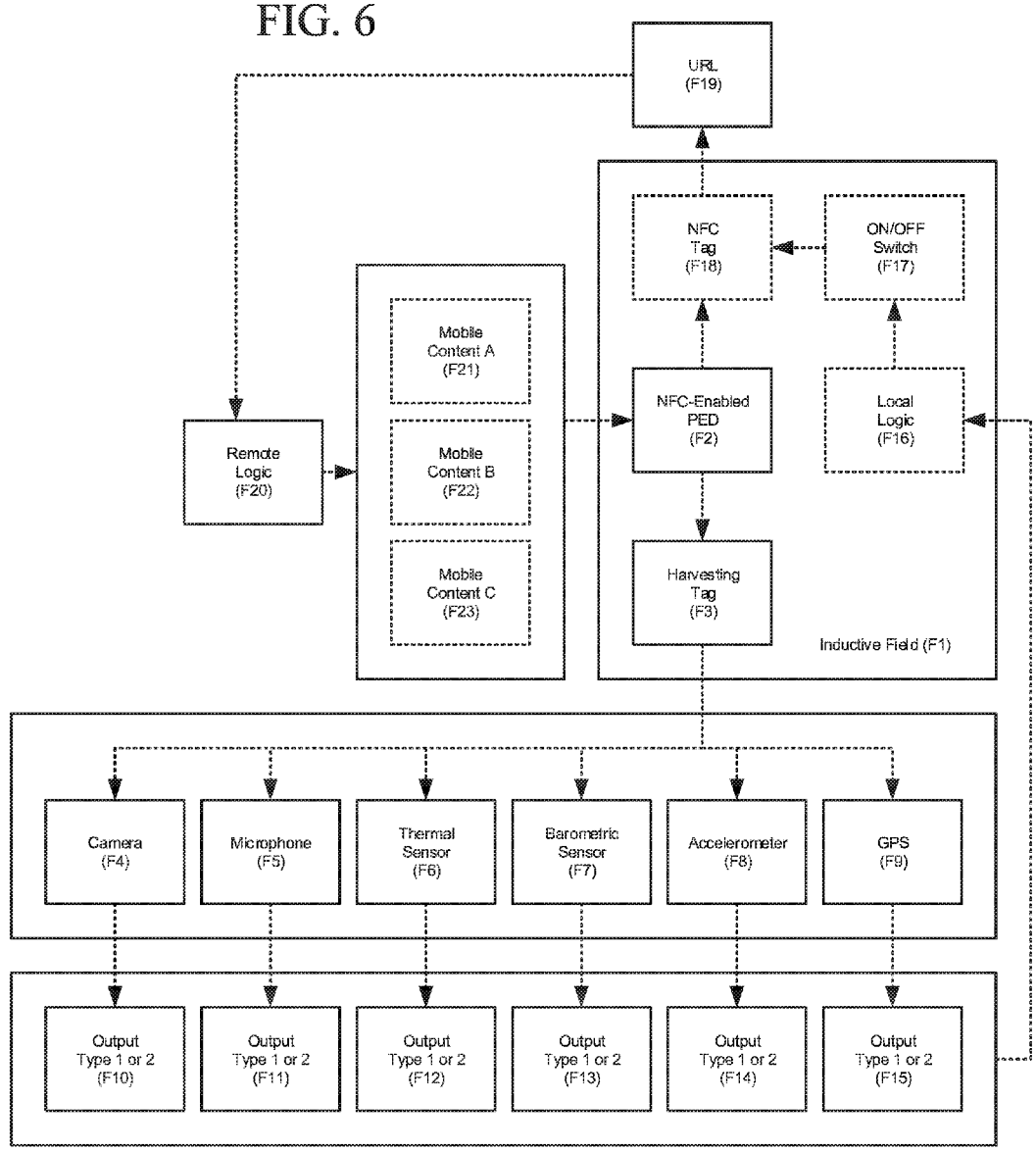
FIG. 6 is a schematic of a sixth embodiment of the invention.

FIG. 6 is a schematic drawing of the Harvesting Tag transferring energy to one or many local hardware devices with or without the presence of an NFC tag and outputting either Type 1 content or Type 2 content depending upon the presence of the NFC tag. FIG. 6 also shows the Type 1 or Type 2 content being transmitted to a local logic application that either allows or disallows the functional operation of the NFC tag. In addition, FIG. 6 also shows an optional remote logic application that can select the content that the NFC tag URL will redirect to.

Figure 7:
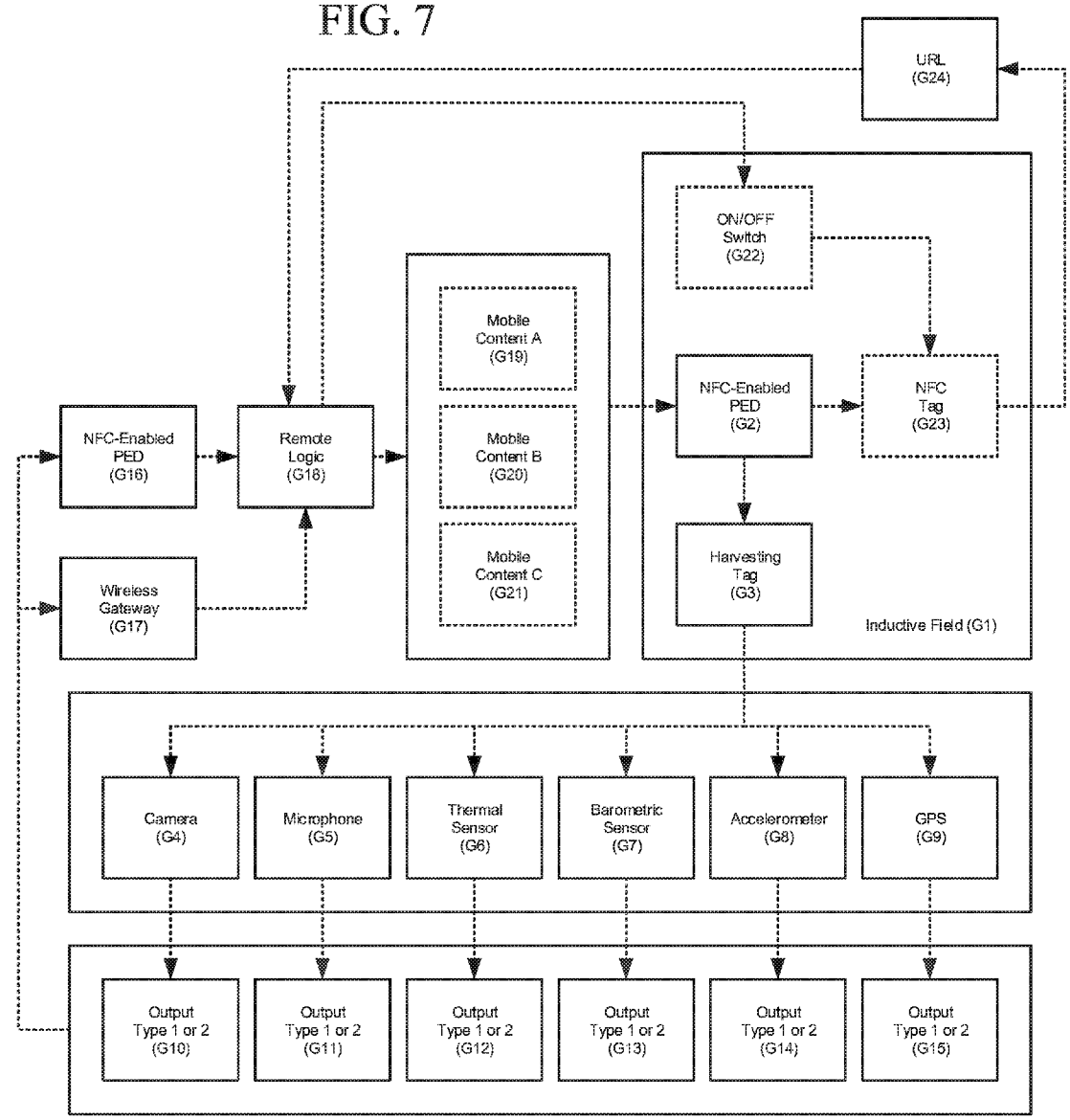
FIG. 7 is a schematic of a seventh embodiment of the invention.

FIG. 7 is a schematic drawing of the Harvesting Tag transferring energy to one or many local hardware devices with or without the presence of an NFC tag and outputting either Type 1 content or Type 2 content depending upon the presence of the NFC tag. FIG. 7 also shows the Type 1 or Type 2 content being transmitted to a remote logic application which, upon analysis, either allows or disallows the functional operation of the NFC tag and can determine the content received by the optional NFC tag engagement initiator (PED).

And further-still, such inter-connected logic capabilities, both local and remote, would make possible local and/or remote termination of the NFC tag experience itself and result in an added layer of security and/or a clearer operational use state for the end user. With such capabilities, it would also be possible to toggle nearby electronic components based on the resulting local hardware output. For example, turning on powered lights if a camera sensor comes back too dark.

Figure 8:
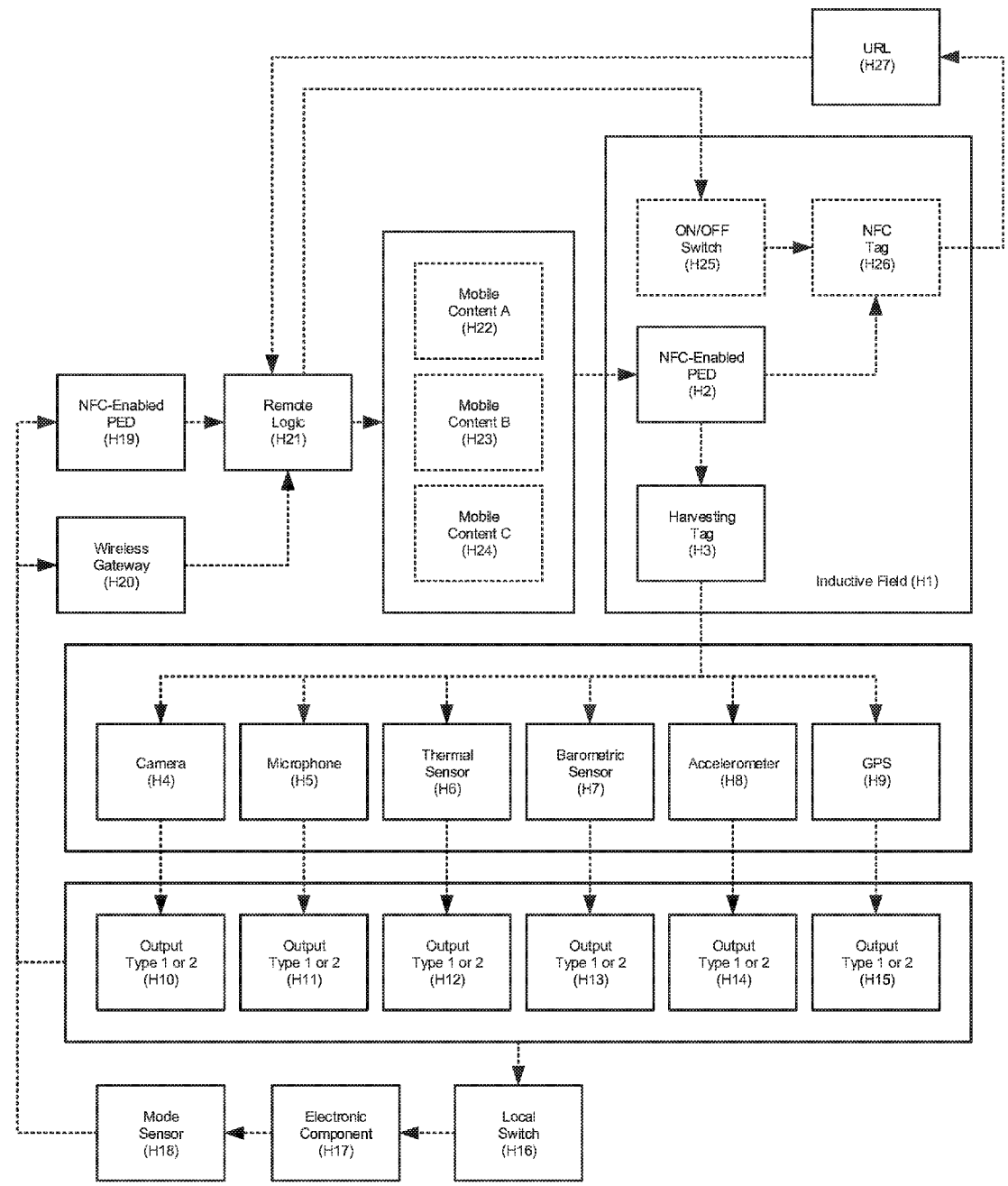
FIG. 8 is a schematic of an eight embodiment of the invention.

FIG. 8 is a schematic drawing of the Harvesting Tag transferring energy to one or many local hardware devices with or without the presence of an NFC tag and outputting either Type 1 content or Type 2 content depending upon the presence of the NFC tag. Figure H also shows the Type 1 or Type 2 content toggling a local switch which in turn controls a local electronic component. The state of this local electronic component can be monitored by a local sensor whose data, along with the local hardware output data, is transmitted to a remote logic application which, upon analysis, either allows or disallows the functional operation of the NFC tag and can determine the content received by the optional NFC tag engagement initiator (PED).

And further-still, these hardware and software systems can be connected to the delivery or non-delivery of data that is facilitated by the design of the nearby, yet physically disconnected NFC tag. As NFC tags are often used to transmit and initiate a web URL for secure or non-secure information and/or files, such systems could be used to measure, record and/or authenticate certain environmental parameters during NFC engagement for proper routing of the NFC tag's content. With such capabilities, it would be possible to provide cloud-based facial recognition authorization services during NFC engagements that would require authentication prior to the delivery of the desired content while simultaneously providing said capabilities within a battery-less package. With such capabilities, it would also be possible to locally or remotely terminate the NFC tag experience itself and result in an added layer of security or a clearer operational use state for the end user. With such capabilities, it would also be possible to toggle nearby electronic components based on the resulting local hardware output. For example, turning on powered lights if a camera sensor comes back too dark.

Figure 9:
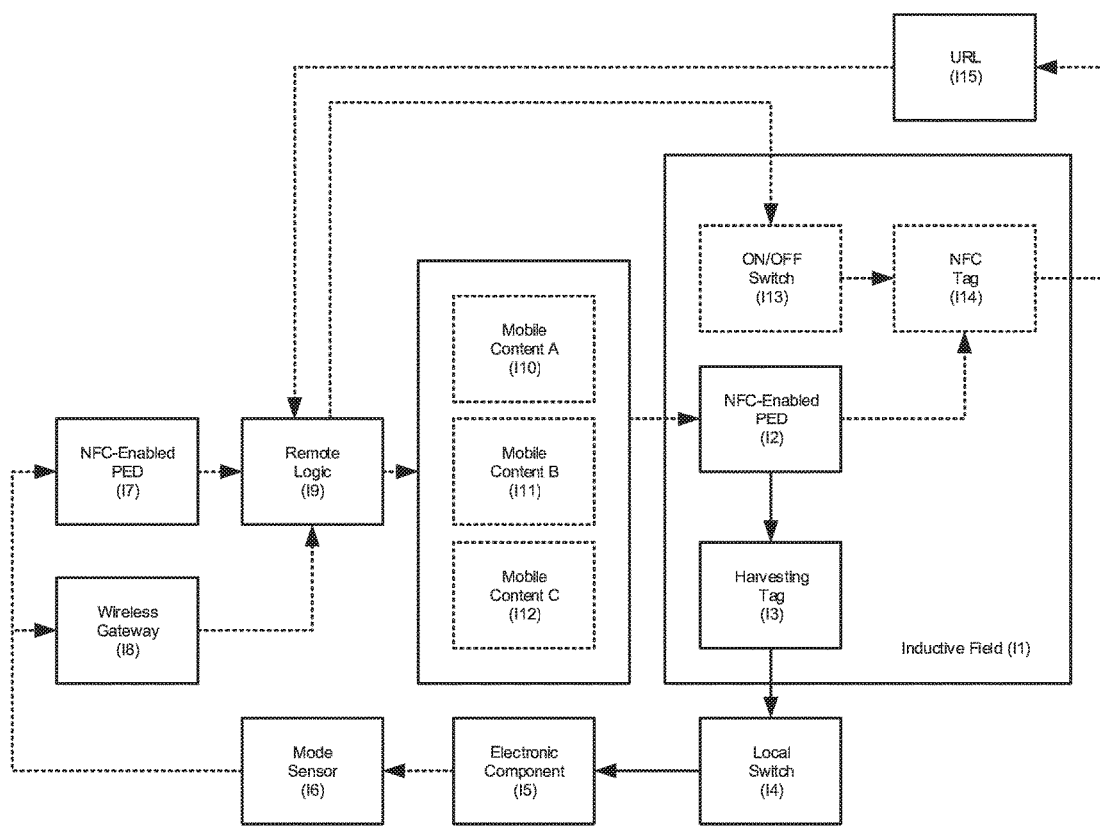
FIG. 9 is a schematic of a ninth embodiment of the invention.

FIG. 9 is a schematic drawing of the Harvesting Tag transferring energy to one or many local switches which in turn controls a local electronic component with or without the presence of an NFC tag and resulting in either Type 1 function or Type 2 function from the local electronic component depending upon the presence of the NFC tag. The state of this local electronic component can be monitored by a local sensor whose data is transmitted to a remote logic application which, upon analysis, either allows or disallows the functional operation of the NFC tag and can determine the content received by the optional NFC tag engagement initiator (PED).

Figure 10:
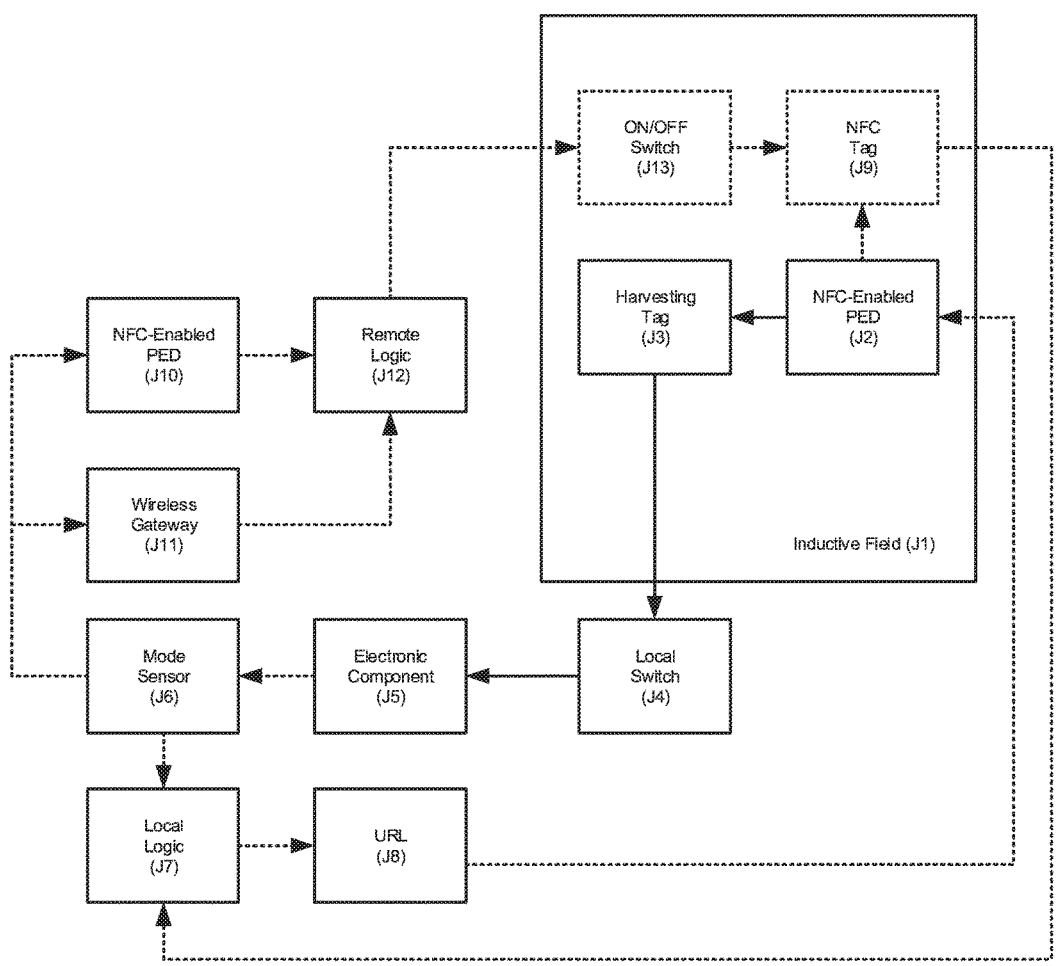
FIG. 10 is a schematic of a tenth embodiment of the invention.

Turning now to FIG. 10 which shows the Harvesting Tag transferring energy to one or many local switches which in turn control a local electronic component with or without the presence of an NFC tag and resulting in either Type 1 function or Type 2 function from the local electronic component depending upon the presence of the NFC tag. The state of this local electronic component can be monitored by a local sensor whose data is transmitted to a remote logic application which, upon analysis, either allows or disallows the functional operation of the NFC tag or may also transmit electronic component mode data to a local logic application which can determine the content that will be received by the optional NFC tag engagement initiator (PED).

Figure 11:
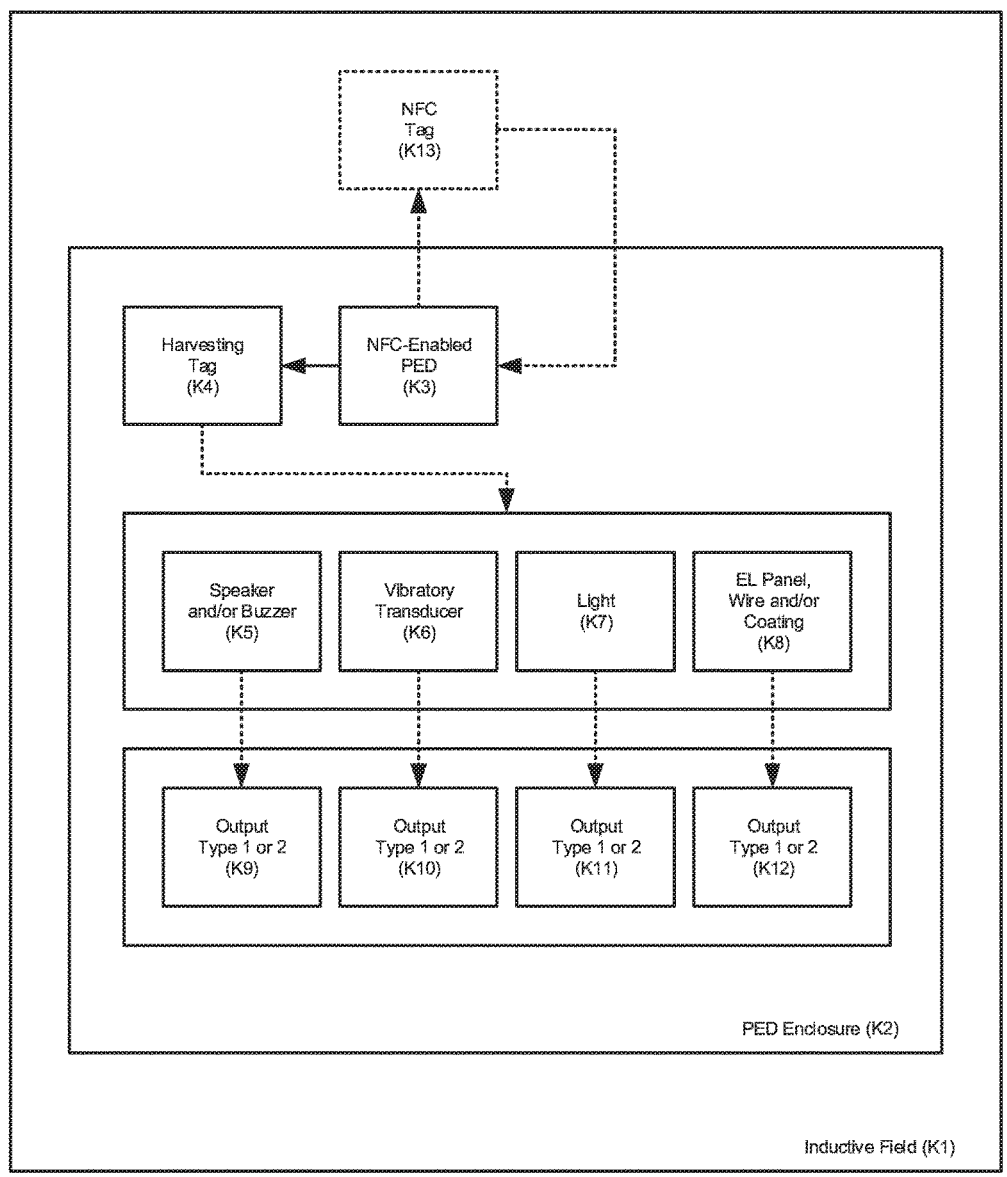
FIG. 11 is a schematic of an 11th embodiment of the invention.

With regard to FIG. 11, the Harvesting Tag transfers energy from the NFC-enabled PED to one or many local hardware devices with or without the presence of an NFC tag and resulting in either Type 1 content or Type 2 content delivered on the PED from the local hardware devices depending upon the presence of the NFC tag during the inductive process.

Figure 12:
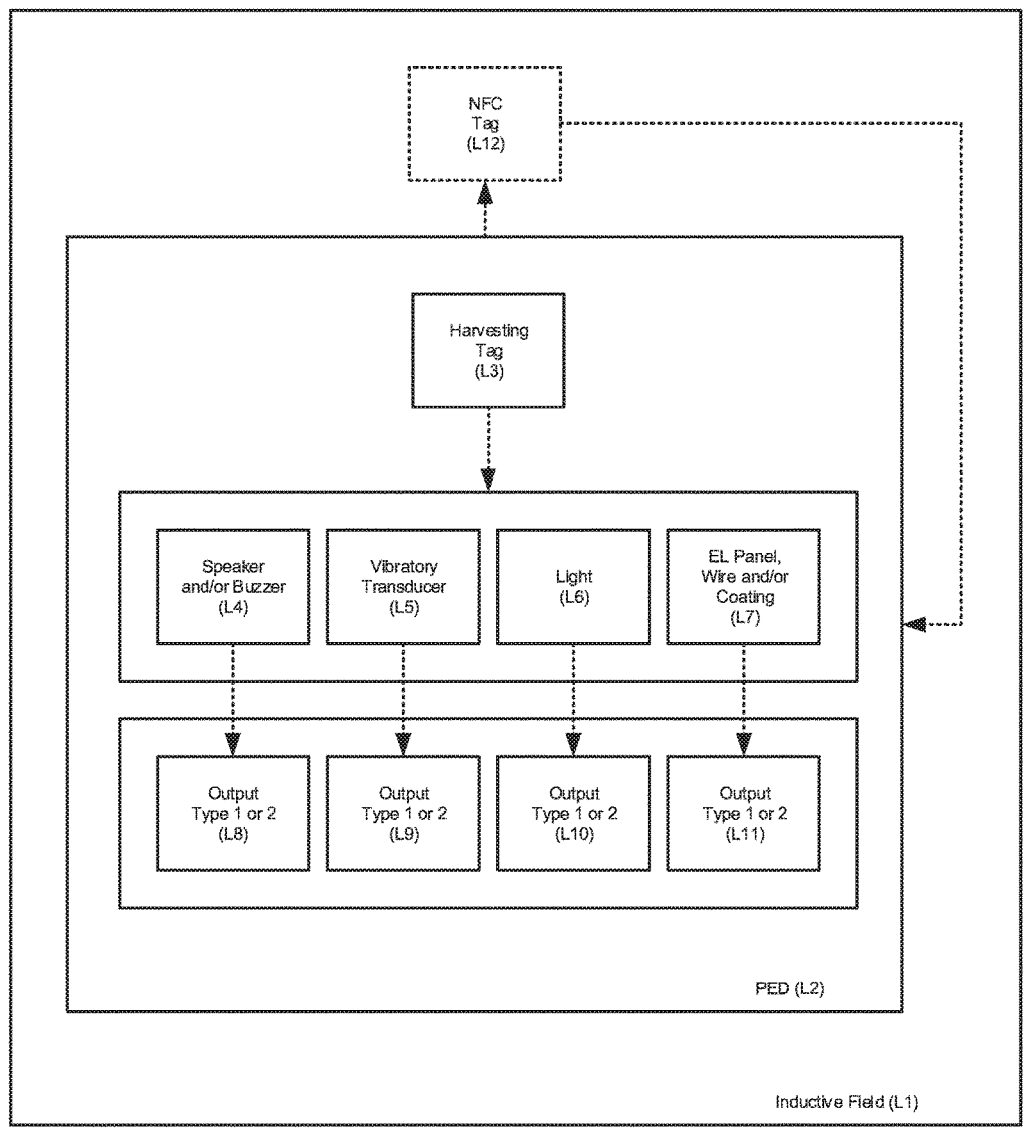
FIG. 12 is a schematic of a twelfth embodiment of the invention.

Lastly, FIG. 12 is a schematic drawing of the Harvesting Tag transferring energy from the NFC-enabled PED during the inductive process to one or many local hardware devices with or without the presence of an NFC tag and resulting in either Type 1 content or Type 2 content delivered through the PED from the local hardware devices depending upon the presence of the NFC tag during the inductive process.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. An energy harvesting system comprising:
   (a) a harvesting tag comprising an antenna tuned for both solo performance and paired performance with at least one NFC tag and turned to operate within an electromagnetic field, wherein the antenna comprises an inductive coil and the electromagnetic field is a first inductive field generated by a NFC-enabled portable electronic device;
   (b) a secondary hardware module adapted to receive an energy signal from the harvesting tag and generate an output, wherein
      (i) the output is a first content type when the harvesting tag is not coupled with the at least one NFC tag,
      (ii) the output is a second content type when the harvesting tag is coupled with the at least one NFC tag,
      (iii) the secondary hardware module comprises a electroluminescent material,
      (iv) the at least one NFC tag is configured to generate a second inductive field in response to the first inductive field, and
      (v) the system further comprises software-controlled hardware that is coupled to the harvesting tag, wherein the software-controlled hardware is configured to control the energy signal from the harvesting tag to the electroluminescent material such that: (A) the energy signal has a first pattern when the harvesting tag is within the first inductive field generated by the NFC-enabled portable electronic device and not within the second inductive field generated by the at least one NFC tag, and (B) the energy signal has a second pattern when the harvesting tag is within the first inductive field and within the second inductive field.

2. An energy harvesting system comprising:
   (a) a harvesting tag comprising an antenna tuned for both solo performance and paired performance with at least one NFC tag and turned to operate within an electromagnetic field, wherein the antenna comprises an inductive coil and the electromagnetic field is a first inductive field generated by a NFC-enabled portable electronic device;
   (b) a secondary hardware module adapted to receive an energy signal from the harvesting tag and generate an output, wherein
      (i) the output is a first content type when the harvesting tag is not coupled with the at least one NFC tag,
      (ii) the output is a second content type when the harvesting tag is coupled with the at least one NFC tag,
      (iii) the secondary hardware module comprises a first electroluminescent material that emits light of a first color and a second electroluminescent material that emits light of a second color,
      (iv) the at least one NFC tag is configured to generate a second inductive field in response to the first inductive field, and (v) the system further comprises software-controlled hardware that is coupled to the harvesting tag, wherein the software-controlled hardware is configured to control the energy signal from the harvesting tag to the secondary hardware module such that: (A) the first electroluminescent material is illuminated when the harvesting tag is within the first inductive field generated by the NFC-enabled portable electronic device and not within the second inductive field generated by the at least one NFC tag, and (B) the second electroluminescent material is illuminated when the harvesting tag is within the first inductive field and also within the second inductive field.

3. An energy harvesting system comprising:
(a) a harvesting tag comprising an antenna tuned for both solo performance and paired performance with at least one NFC tag and turned to operate within an electromagnetic field;
(b) a secondary hardware module adapted to receive an energy signal from the harvesting tag and generate an output, wherein
   (i) the output is a first content type when the harvesting tag is not coupled with the at least one NFC tag,
   (ii) the output is a second content type when the harvesting tag is coupled with the at least one NFC tag, and
   (iii) the secondary hardware module generates biometric data for a user, and the output is user biometric data,
(c) a portable electronic device having a remote logic application that is configured to: (i) receive the output and generate a decision, and (ii) analyze the user biometric data to verify an identity of the user, wherein the decision is a first type when the user can be identified and a second type when the user cannot be identified;
(d) software-controlled hardware that is local to the harvesting tag that is configured to receive the decision.

4. An energy harvesting system comprising:
(a) a harvesting tag comprising an antenna tuned for both solo performance and paired performance with at least one NFC tag and turned to operate within an electromagnetic field, wherein the antenna comprises an inductive coil and the electromagnetic field is a first inductive field generated by a NFC-enabled portable electronic device;
(b) a secondary portable electronic device having a remote logic application;
(c) a secondary hardware module adapted to receive an energy signal from the harvesting tag and generate an output, wherein
   (i) the output is a first content type when the harvesting tag is not coupled with the at least one NFC tag,
   (ii) the output is a second content type when the harvesting tag is coupled with the at least one NFC tag,
   (iii) the at least one NFC tag is configured to broadcast at least one website universal resource locator in response to the first inductive field, and
   (v) the remote logic application is configured to perform the operations of (A) receiving the at least one website universal resource locator, (B) receiving the output, (C) selecting one of the at least one website universal resource locators based on the output, and
   (D) transmitting the selected website universal resource locator to the NFC-enabled portable electronic device.

5. An energy harvesting system of comprising:
(a) a harvesting tag comprising an antenna tuned for both solo performance and paired performance with at least one NFC tag and turned to operate within an electromagnetic field, wherein the antenna comprises an inductive coil and the electromagnetic field is a first inductive field generated by a NFC-enabled portable electronic device;
(b) a secondary portable electronic device having a remote logic application;
(c) a secondary hardware module adapted to receive an energy signal from the harvesting tag and generate an output, wherein
   (i) the output is a first content type when the harvesting tag is not coupled with the at least one NFC tag,
   (ii) the output is a second content type when the harvesting tag is coupled with the at least one NFC tag,
   (iii) the at least one NFC tag is configured to broadcast at least one website universal resource locator in response to the first inductive field,
   (iv) the secondary hardware module is configured to capture biometric data from a user and the output comprises user biometric data, and
   (v) the remote logic application is configured to perform the operations of (A) receiving the at least one website universal resource locator, (B) receiving the user biometric data, (C) analyzing the user biometric data to positively or negatively verify a user identity, and (D) transmitting the at least one website universal resource locator to the NFC-enabled portable electronic device when the user identity is positively verified.

6. An energy harvesting system comprising:
(a) a harvesting tag comprising an antenna tuned for both solo performance and paired performance with at least one NFC tag and turned to operate within an electromagnetic field, wherein the antenna comprises an inductive coil and the electromagnetic field is a first inductive field generated by a NFC-enabled portable electronic device;
(b) a secondary portable electronic device having a remote logic application;
(c) a secondary hardware module adapted to receive an energy signal from the harvesting tag and generate an output, wherein
   (i) the output is a first content type when the harvesting tag is not coupled with the at least one NFC tag,
   (ii) the output is a second content type when the harvesting tag is coupled with the at least one NFC tag,
   (iii) the at least one NFC tag is configured to broadcast at least one website universal resource locator in response to the first inductive field, and
   (iv) the remote logic application is configured to perform the operations of (A) receiving the at least one website universal resource locator, (B) receiving the output, (C) generating webpage content based on the output and the website universal resource locator, and (D) transmitting the webpage content to the NFC-enabled portable electronic device.

7. An energy harvesting system comprising:
(a) a harvesting tag comprising an antenna tuned for both solo performance and paired performance with at least one NFC tag and turned to operate within an electromagnetic field, wherein the antenna comprises an inductive coil and the electromagnetic field is a first inductive field generated by a NFC-enabled portable electronic device;
(b) a secondary portable electronic device having a remote logic application;
(c) a secondary hardware module adapted to receive an energy signal from the harvesting tag and generate an output, wherein
  (i) the output is a first content type when the harvesting tag is not coupled with the at least one NFC tag,
  (ii) the output is a second content type when the harvesting tag is coupled with the at least one NFC tag,
  (iii) the at least one NFC tag is configured to broadcast at least one website universal resource locator in response to the first inductive field; and
  (iv) the remote logic application is configured to perform the operations of:
    (A) receiving the output,
    (B) enabling or disabling the at least one NFC tag from broadcasting the at least one website universal resource locator based on the output,
    (C) receiving the at least one website universal resource locator broadcast by the at least one NFC tag when the at least one NFC tag is enabled,
    (D) generating webpage content based on the output and the website universal resource locator, and
    (E) transmitting the webpage content to the NFC-enabled portable electronic device.

8. An energy harvesting system:
(a) a harvesting tag comprising an antenna tuned for both solo performance and paired performance with at least one NFC tag and turned to operate within an electromagnetic field;
(b) a secondary hardware module adapted to receive an energy signal from the harvesting tag and generate an output, wherein (i) the output is a first content type when the harvesting tag is not coupled with the at least one NFC tag, (ii) the output is a second content type when the harvesting tag is coupled with the at least one NFC tag, and (iii) wherein the secondary hardware module is a camera and the output comprises a digital image and the energy signal;
(c) a local switch coupled to an electronic component and configured to receive the output;
(d) a mode sensor coupled to the electronic component and configured to monitor the state of the electronic component and generate a component status, wherein (i) the electronic component comprises an electroluminescent material, and (ii) the component status indicates whether the electroluminescent material is illuminated nor not illuminated;
(e) a secondary portable electronic device having a remote logic application, wherein the remote logic application is configured to perform the operations of:
  (i) receiving the output and the component status,
  (ii) enabling or disabling the at least one NFC tag from generating an inductive field based on the output and the component status,
  (iii) determining whether a pixel intensity of the digital image is below a predetermined intensity threshold, and
  (iv) closing the local switch to illuminate the electroluminescent material when the pixel intensity is below the predetermined threshold and when the electroluminescent material is not illuminated.

9. The system of claim 8 wherein:
(a) the at least one NFC tag is configured to broadcast at least one website universal resource locator in response to the first inductive field, and
(b) the remote logical application is further configured to perform the operations comprising: (i) receiving the at least one website universal resource locator, (ii) generating webpage content based on the component status and the website universal resource locator, and (iii) transmitting the webpage content to the NFC-enabled portable electronic device.

* * * * *

UNITED STATES PATENT AND TRADEMARK OFFICE
CERTIFICATE OF CORRECTION

PATENT NO.        : 10,116,354 B2
APPLICATION NO.   : 15/402190
DATED             : October 30, 2018
INVENTOR(S)       : William T. Pittman et al.

Page 1 of 1

It is certified that error appears in the above-identified patent and that said Letters Patent is hereby corrected as shown below:

In Claim 1, Column 6, element (a), Line 14, the word "turned" should be replaced with the word "tuned."

In Claim 2, Column 6, element (a), Line 48, the word "turned" should be replaced with the word "tuned."

In Claim 3, Column 7, element (a), Line 19, the word "turned" should be replaced with the word "tuned."

In Claim 4, Column 7, element (a), Line 45, the word "turned" should be replaced with the word "tuned."

In Claim 5, Column 8, element (a), Line 7, the word "turned" should be replaced with the word "tuned."

In Claim 6, Column 8, element (a), Line 40, the word "turned" should be replaced with the word "tuned."

In Claim 7, Column 9, element (a), Line 1, the word "turned" should be replaced with the word "tuned."

In Claim 8, Column 9, element (a), Line 35, the word "turned" should be replaced with the word "tuned."

Signed and Sealed this
Nineteenth Day of February, 2019

Andrei Iancu
*Director of the United States Patent and Trademark Office*